(12) United States Patent  (10) Patent No.: US 7,408,072 B2
Yoshida et al.  (45) Date of Patent: Aug. 5, 2008

(54) HETEROPOLYCYCLIC COMPOUND AND DYE

(75) Inventors: Katsuhira Yoshida, Kochi (JP); Yousuke Ooyama, Kochi (JP)

(73) Assignee: Kochi University, Kochi (JP)

( * ) Notice: Subject to any disclaimer, the term of this patent is extended or adjusted under 35 U.S.C. 154(b) by 64 days.

(21) Appl. No.: 10/588,697

(22) PCT Filed: Feb. 10, 2005

(86) PCT No.: PCT/JP2005/002026

§ 371 (c)(1),
(2), (4) Date: Aug. 8, 2006

(87) PCT Pub. No.: WO2005/078024

PCT Pub. Date: Aug. 25, 2005

(65) Prior Publication Data

US 2007/0185338 A1   Aug. 9, 2007

(30) Foreign Application Priority Data

Feb. 13, 2004   (JP)   ............... 2004-036803

(51) Int. Cl.
*C07D 307/77* (2006.01)
*C07D 311/78* (2006.01)
(52) U.S. Cl. .................. 549/457; 549/224; 548/420; 546/75
(58) Field of Classification Search .............. 549/24, 549/42, 457, 224; 548/420; 546/75
See application file for complete search history.

(56) References Cited

FOREIGN PATENT DOCUMENTS

JP   WO 2004/072053   8/2004

OTHER PUBLICATIONS

Yoshida et al. Journal of Chemical society, Perkin Transactions 1, 1990, pp. 1891-1895.*
Katsuhira Yoshida, Tetsunao Koujiri, Norio Oga, Miwa Ishiguro, Yuji Kubo, "The Effect of Metal Chelete Complexation on the Reactivity and Absorption Spectra of 1,2-Naphthoquinones: New Types Near-infrared-absorbing Metal Complex Dyes", *Journal of the Chemical Society*, Perkin Transactions 1: Organic and Bio-Organic Chemistry, 1990, No. 7, pp. 1891 to 1895. [Abstract].

* cited by examiner

Primary Examiner—D. Margaret Seaman
Assistant Examiner—Nizal S Chandrakumar
(74) Attorney, Agent, or Firm—Posz Law Group, PLC

(57) ABSTRACT

The present invention provides heteropolycyclic compounds represented by General Formulae (1) and (2):

[Chemical Formula 1]

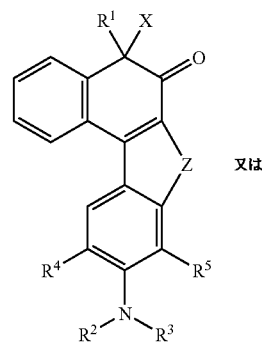

(1)

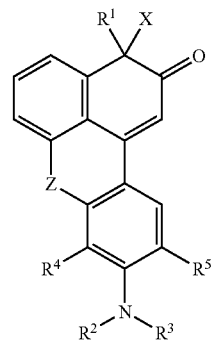

(2)

wherein $R^1$ is a straight- or branched-chain $C_1$-$C_{10}$ alkyl group or the like; $R^2$ and $R^3$ are the same or different and are each a straight- or branched-chain $C_1$-$C_{10}$ alkyl group or the like; $R^4$ and $R^5$ are each a hydrogen atom; X is —OH or the like; X' is a straight- or branched-chain $C_1$-$C_{10}$ alkyl group or the like; and Z is —O— or the like. The heteropolycyclic compounds of the present invention have appropriate optical absorption wavelengths and fluorescence wavelengths and a high luminescence intensity, and can be advantageously used in various applications as colorants that have excellent performance in terms of heat resistance, light resistance, solubility, dispersibility in resist materials, solid luminescence, etc.

12 Claims, No Drawings

HETEROPOLYCYCLIC COMPOUND AND DYE

TECHNICAL FIELD

The present invention relates to heteropolycyclic compounds and colorants.

BACKGROUND ART

Colorants have heretofore been used as dyes or pigments, but with the progress of electronics technologies, they are increasingly used in various fields as key materials for information display and data recording systems. Accordingly, colorants are required to have various abilities, and the development of colorants having physical and functional properties suitable for many applications is demanded.

With respect to fluorescent colorants, high luminescence intensities, and appropriate optical absorption wavelengths and luminescence wavelengths are desired. Further, it is desired for fluorescent colorants to emit light, not only in solution but also in the solid state (this property is hereinafter referred to as "solid-state luminescence"), and to have excellent performance in terms of heat resistance, light resistance, solubility, dispersibility in resist materials, etc.

DISCLOSURE OF THE INVENTION

Problems to be Solved by the Invention

An object of the present invention is to provide novel compounds that have appropriate optical absorption wavelengths and luminescence wavelengths, a high luminescence intensity, and excellent performance in terms of heat resistance, light resistance, solubility, dispersibility in resist materials, solid luminescence, etc., and that can be advantageously used as a fluorescent colorant.

Means for Solving the Problems

The present inventors conducted extensive research to solve the above problems, and as a result, succeeded in synthesizing heteropolycyclic compounds represented by General Formulae (1) and (2). Further, the present inventors found that these heteropolycyclic compounds have appropriate optical absorption wavelengths and luminescence wavelengths, and serve as fluorescent colorants that have high luminescence intensities and excellent performance in terms of heat resistance, light resistance, solubility, dispersibility in resist materials, solid luminescence, etc. The present invention has been accomplished based on these new findings.

The present invention provides the heteropolycyclic compounds, colorants, and pigments or dyes according to the following items 1 to 8.

1. A heteropolycyclic compound represented by General Formula (1):

[Chemical Formula 1]

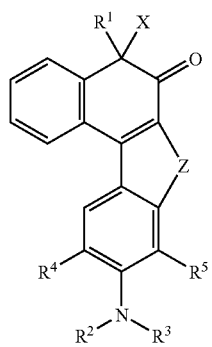

(1)

wherein $R^1$ is a straight- or branched-chain $C_1$-$C_{10}$ alkyl group, a substituted or unsubstituted $C_5$-$C_{10}$ cycloalkyl group or a substituted or unsubstituted phenyl group;

$R^2$ and $R^3$ are the same or different and are each a straight- or branched-chain $C_1$-$C_{10}$ alkyl group, a substituted or unsubstituted $C_5$-$C_{10}$ cycloalkyl group or a substituted or unsubstituted phenyl group, or $R^2$ and $R^3$ may be linked to each other to form, together with the nitrogen atom to which they are attached, a heterocyclic ring;

$R^4$ and $R^5$ are each a hydrogen atom;

$R^2$ and $R^4$ and/or $R^3$ and $R^5$ may be linked to each other to form a straight- or branched-chain $C_2$-$C_7$ alkylene group;

X is a hydrogen atom, a straight- or branched-chain $C_1$-$C_{10}$ alkyl group, a substituted or unsubstituted $C_5$-$C_{10}$ cycloalkyl group, a substituted or unsubstituted phenyl group, a halogen atom, an —$OCOR^6$ group, an —$OR^6$ group, an $SR^6$ group or an —$NR^6R^7$ group;

$R^6$ and $R^7$ are the same or different and are each a hydrogen atom, a straight- or branched-chain $C_1$-$C_6$ alkyl group or a substituted or unsubstituted $C_5$-$C_{10}$ cycloalkyl group; and Z is a divalent group.

2. A heteropolycyclic compound according to item 1, wherein, in General Formula (1), $R^1$ is a straight- or branched-chain $C_1$-$C_{10}$ alkyl group or a substituted or unsubstituted phenyl group; $R^2$ and $R^3$ are each independently a straight- or branched-chain $C_1$-$C_{10}$ alkyl group; $R^4$ and $R^5$ are each a hydrogen atom; X is a hydrogen atom, a straight- or branched-chain $C_1$-$C_{10}$ alkyl group, a hydroxy group or an —$OCOR^6$ group wherein $R^6$ is a hydrogen atom or a straight- or branched-chain $C_1$-$C_6$ alkyl group; and Z is —O—, —S— or —$NR^6$— wherein $R^6$ is a hydrogen atom or a straight- or branched-chain $C_1$-$C_6$ alkyl group.

3. A heteropolycyclic compound according to item 1, wherein, in General Formula (1), $R^1$ is a straight- or branched-chain $C_1$-$C_6$ alkyl group or an unsubstituted phenyl group; $R^2$ and $R^3$ are each independently a straight- or branched-chain $C_1$-$C_6$ alkyl group; $R^4$ and $R^5$ are each a hydrogen atom; X is a hydrogen atom, a straight- or branched-chain $C_1$-$C_6$ alkyl group, a hydroxy group or an —$OCOR^6$ group wherein $R^6$ is a straight- or branched-chain $C_1$-$C_6$ alkyl group; and Z is —O—, —S— or —NH—.

4. A heteropolycyclic compound represented by General Formula (2):

[Chemical Formula 2]

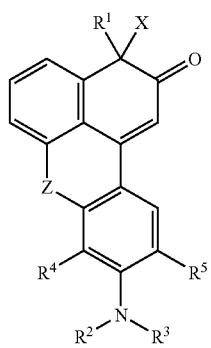

(2)

wherein $R^1$ is a straight- or branched-chain $C_1$-$C_{10}$ alkyl group, a substituted or unsubstituted $C_5$-$C_{10}$ cycloalkyl group or a substituted or unsubstituted phenyl group;

$R^2$ and $R^3$ are the same or different and are each a straight- or branched-chain $C_1$-$C_{10}$ alkyl group, a substituted or unsubstituted $C_5$-$C_{10}$ cycloalkyl group or a substituted or unsubstituted phenyl group, or $R^2$ and $R^3$ may be linked to each other to form, together with the nitrogen atom to which they are attached, a heterocyclic ring;

$R^4$ and $R^5$ are each a hydrogen atom;

$R^2$ and $R^4$, and/or $R^3$ and $R^5$ may be linked to each other to form a straight- or branched-chain $C_2$-$C_7$ alkylene group;

X is a hydrogen atom, a straight- or branched-chain $C_1$-$C_{10}$ alkyl group, a substituted or unsubstituted $C_5$-$C_{10}$ cycloalkyl group, a substituted or unsubstituted phenyl group, a halogen atom, an —$OR^6$ group, an —$OCOR^6$ group, an —$SR^6$ group or an —$NR^6R^7$ group;

$R^6$ and $R^7$ are the same or different and are each a hydrogen atom, a straight- or branched-chain $C_1$-$C_6$ alkyl group or a substituted or unsubstituted $C_5$-$C_{10}$ cycloalkyl group; and Z is a divalent group.

5. A heteropolycyclic compound according to item 4, wherein, in General Formula (2), $R^1$ is a straight- or branched-chain $C_1$-$C_{10}$ alkyl group or a substituted or unsubstituted phenyl group; $R^2$ and $R^3$ are each independently a straight- or branched-chain $C_1$-$C_{10}$ alkyl group; $R^4$ and $R^5$ are each a hydrogen atom; X is a hydrogen atom, a straight- or branched-chain $C_1$-$C_{10}$ alkyl group, a hydroxy group or an —$OCOR^6$ group wherein $R^6$ is a hydrogen atom or a straight- or branched-chain $C_1$-$C_6$ alkyl group; and Z is —O—, —S— or —$NR^6$— wherein $R^6$ is a hydrogen atom or a straight- or branched-chain $C_1$-$C_6$ alkyl group.

6. The heteropolycyclic compound according to item 4, wherein, in General Formula (2), $R^1$ is a straight- or branched-chain $C_1$-$C_6$ alkyl group or an unsubstituted phenyl group; $R^2$ and $R^3$ are each independently a straight- or branched-chain $C_1$-$C_6$ alkyl group; $R^4$ and $R^5$ are each a hydrogen atom; X is a hydrogen atom, a straight- or branched-chain $C_1$-$C_6$ alkyl group, a hydroxy group or an —$OCOR^6$ group wherein $R^6$ is a straight- or branched-chain $C_1$-$C_6$ alkyl group; and Z is —O—, —S— or —NH—.

7. A colorant comprising a heteropolycyclic compound according to any one of items 1 to 6.

8. A pigment or dye comprising a heteropolycyclic compound according to any one of items 1 to 6.

Heteropolycyclic Compound

As used herein, the groups in General Formulae (1) and (2) are specifically as follows.

Examples of straight- and branched-chain $C_1$-$C_{10}$ alkyl groups represented by $R^1$, $R^2$, $R^3$ and X include methyl, ethyl, n-propyl, isopropyl, n-butyl, isobutyl, sec-butyl, tert-butyl, n-pentyl, neopentyl, n-hexyl, n-octyl, 2-ethylhexyl, n-decyl, etc. Such alkyl groups are preferably straight- or branched-chain $C_1$-$C_6$ alkyl groups, and more preferably straight- or branched-chain $C_1$-$C_4$ alkyl groups.

Examples of substituents of $C_5$-$C_{10}$ cycloalkyl groups represented by $R^1$, $R^2$, $R^3$, $R^6$, $R^7$ and X include straight- and branched-chain $C_1$-$C_6$ alkyl groups and the like. Straight- and branched-chain $C_1$-$C_6$ alkyl groups include, for example, methyl, ethyl, n-propyl, isopropyl, n-butyl, isobutyl, sec-butyl, tert-butyl, n-pentyl, neopentyl, n-hexyl, etc. It is preferable that at least one, and more preferably 1 to 2, such groups be substituted on a cycloalkyl ring. The cycloalkyl ring may be substituted at any of the 2-, 3- and 4-positions.

Examples of substituted and unsubstituted $C_5$-$C_{10}$ cycloalkyl groups represented by $R^1$, $R^2$, $R^3$, $R^6$, $R^7$ and X include cyclopentyl, methylcyclopentyl, dimethylcyclopentyl, ethylcyclopentyl, n-butylcyclopentyl, cyclohexyl, methylcyclohexyl, dimethylcyclohexyl, ethylcyclohexyl, n-butylcyclohexyl, cyclooctyl, cyclodecyl, etc. Positional isomers and stereoisomers of such groups are also included.

Examples of substituents of phenyl groups represented by $R^1$, $R^2$, $R^3$, and X include straight- and branched-chain $C_1$-$C_6$ alkyl groups, di($C_1$-$C_6$ alkyl)amino groups, etc. Straight- and branched-chain $C_1$-$C_6$ alkyl groups include, for example, methyl, ethyl, n-propyl, isopropyl, n-butyl, isobutyl, sec-butyl, tert-butyl, n-pentyl, neopentyl, n-hexyl, etc. Examples of di($C_1$-$C_6$ alkyl)amino groups include dimethylamino, diethylamino, di(n-propyl)amino, di(isopropyl)amino, di(n-butyl)amino, di(isobutyl)amino, di(n-pentyl)amino, di(n-hexyl)amino, methylethylamino, methyl-n-propylamino, methyl-n-butylamino, ethyl-n-propylamino, ethyl-n-butylamino, etc. It is preferable that at least one, and more preferably 1 to 2, such groups be substituted on a phenyl ring. The phenyl ring may be substituted at any of the 2-, 3- and 4-positions, and preferably at the 4-position.

Examples of substituted and unsubstituted phenyl groups represented by X include phenyl, tolyl, xylyl, mesityl, cumenyl, ethylphenyl, n-propylphenyl, n-butylphenyl, n-hexylphenyl, n-octylphenyl, dimethylaminophenyl, diethylaminophenyl, di(n-propyl)aminophenyl, di(isopropyl)aminophenyl, di(n-butyl)aminophenyl, di(isobutyl)aminophenyl, di(n-pentyl)aminophenyl, di(n-hexyl)aminophenyl, etc. Positional isomers and stereoisomers of such groups are also included.

Examples of heterocyclic rings formed by $R^2$ and $R^3$ linked to each other together with the nitrogen atom to which they are attached include piperidine rings, morpholine rings, pyrrolidine rings, piperazine rings, etc.

Examples of straight- and branched-chain $C_2$-$C_7$ alkylene groups formed by $R^2$ and $R^4$, or $R^3$ $R^5$, linked to each other include ethylene, methylethylene, propylene, tetramethylene, methylpropylene, dimethylethylene, pentamethylene, hexamethylene, heptamethylene, etc.

Halogen atoms represented by X include fluorine atoms, chlorine atoms, bromine atoms and iodine atoms.

Examples of straight- and branched-chain $C_1$-$C_6$ alkyl groups represented by $R^6$ and $R^7$ include methyl, ethyl, n-propyl, isopropyl, n-butyl, isobutyl, sec-butyl, tert-butyl, n-pentyl, neopentyl, n-hexyl, etc.

Examples of —$OCOR^6$ groups represented by X include formyloxy, acetyloxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, n-pentylcarbonyloxy, neopentylcarbonyloxy, n-hexylcarbonyloxy, etc.

Examples of —$OR^6$ groups represented by X include hydroxy, methoxy, ethoxy, n-propoxy, isopropoxy, n-butoxy, isobutoxy, sec-butoxy, tert-butoxy, n-pentyloxy, neopentyloxy, n-hexyloxy, cyclopentyloxy, cyclohexyloxy, etc.

Examples of —$SR^6$ groups represented by X include mercapto, methylthio, ethylthio, n-propylthio, isopropylthio, n-butylthio, isobutylthio, sec-butylthio, tert-butylthio, n-pentylthio, neopentylthio, n-hexylthio, cyclopentylthio, cyclohexylthio, etc.

Examples of —$NR^6R^7$ groups represented by X include amino, methylamino, ethylamino, n-propylamino, isopropylamino, n-butylamino, isobutylamino, tert-butylamino, n-pentylamino, n-hexylamino, dimethylamino, diethylamino, methylethylamino, di(n-propyl)amino, di(isopropyl)amino, di(n-butyl)amino, di(isobutyl)amino, di(tert-butyl)amino, di(n-pentyl)amino, di(n-hexyl)amino, cyclopentylamino, cyclohexylamino, dicyclopentylamino, dicyclohexylamino, (methyl)(cyclohexyl)amino, etc.

Divalent groups represented by Z include, for example, —O—, —S—, —Se—, —NR$^6$— wherein R$^6$ is as defined above, etc. Specific examples of —NR$^6$— include —NH—, —N(CH$_3$)—, —N(C$_2$H$_5$)—, etc.

The heteropolycyclic compound of General Formula (1) of the present invention can be produced, for example, as shown in Reaction Scheme-1 given below. That is, a heteropolycyclic compound represented by General Formula (1) wherein X is a hydroxy group (this compound is hereinafter referred to as "Compound (1a)") can be produced by reacting a heteropolycyclic compound of General Formula (3) with a compound of General Formula (5). Further, a heterocyclic compound represented by General Formula (1) wherein X is a group other than a hydroxy group (this compound is hereinafter referred to as "Compound (1b)") can be produced by substituting the hydroxy group in Compound (1a) with another group.

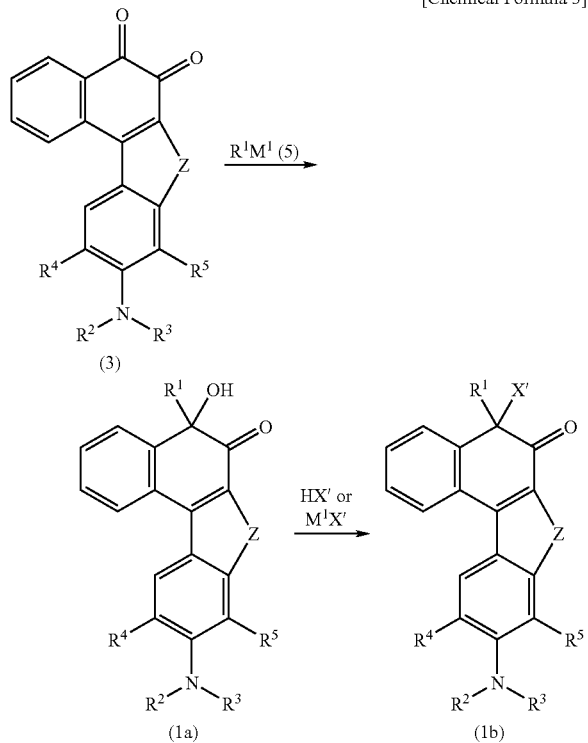

wherein R$^1$, R$^2$, R$^3$, R$^4$, R$^5$ and Z are as defined above; X' is the same as X except that X' is not a hydroxy group; and M$^1$ is an alkali-metal atom, an alkaline-earth-metal atom, or like metal atom.

The heteropolycyclic compound represented by General Formula (3) is a new compound, and is produced, for example, as shown in Reaction Scheme-5 given below. Compounds represented by General Formula (5) are known, readily available compounds. M$^1$ in General Formula (5) is, for example, lithium, potassium, sodium or like alkali-metal atom.

The reaction of the heteropolycyclic compound of General Formula (3) with the compound of General Formula (5) is performed, for example, in a suitable solvent. A wide variety of known solvents can be used as long as they do not adversely affect the reaction. Examples of usable solvents include tetrahydrofuran (THF), diethyl ether and like ether solvents. The mole ratio of the heteropolycyclic compound of General Formula (3) to the compound of General Formula (5) is usually about 1:1 to about 1:2, and is preferably about 1:1.2 to about 1:1.5. The reaction can be performed either at room temperature or with cooling.

The reaction for obtaining Compound (1b) from Compound (1a) can be easily performed by applying a known substitution reaction.

For example, Compound (1b) in which X' is a halogen atom can be obtained by reacting Compound (1a) with a hydrohalic acid in a solvent such as THF, at a suitable temperature.

Compound (1b) in which X' is a straight- or branched-chain C$_1$-C$_{10}$ alkyl group can be obtained by reacting Compound (1a) with a boron trifluoride ether complex in a solvent such as THF, at a suitable temperature, and then reacting the reaction product with an N,N-dialkylaniline or alkyllithium reagent.

Compound (1b) in which X' is an —OCOR$^6$ group (wherein R$^6$ is as defined above) can be obtained by reacting Compound (1a) with a compound represented by the general formula R$^6$COOCl (wherein R$^6$ is as defined above) in a solvent such as THF, in the presence of a dehydrochlorinating agent (e.g., sodium carbonate or the like).

Compound (1b) in which X' is a straight- or branched-chain C$_1$-C$_{10}$ alkyl group can also be obtained by reducing Compound (1a), followed by alkylation of the resulting Compound (1a'), as shown in Reaction Scheme-2 given below:

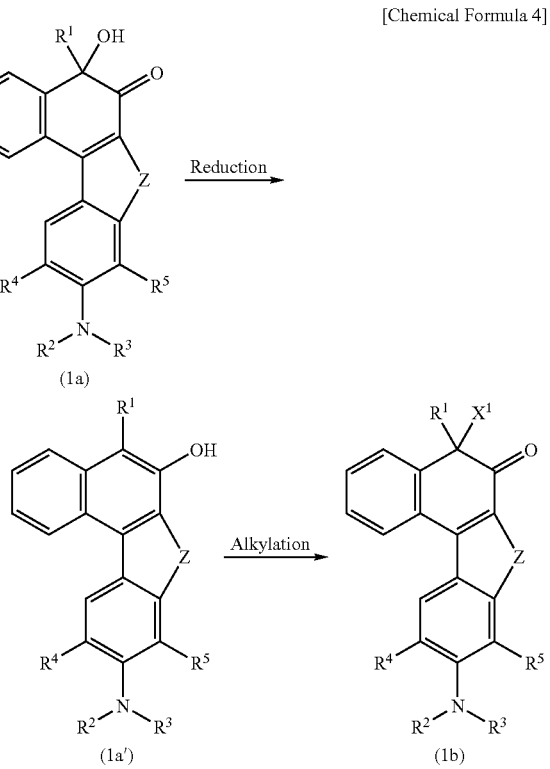

wherein R$^1$, R$^2$, R$^3$, R$^4$, R$^5$ and Z are as defined above; and X$^1$ is a straight- or branched-chain C$_1$-C$_{10}$ alkyl group.

A wide variety of reaction conditions for known reduction reactions using reducing agents can be applied to the reduction of Compound (1a). Usable reducing agents include, for example, palladium-carbon and the like. Usable reaction solvents include, for example, ethanol and like alcohols.

The subsequent alkylation of Compound (1b) is carried out by reacting Compound (1a') with an alkylating agent in the presence of a strong base. Examples of strong bases include lithium tert-butoxide, sodium tert-butoxide, etc. Examples of alkylating agents include methyl chloride, ethyl chloride, n-propyl chloride, isopropyl chloride, n-butyl chloride, sec-butyl chloride, tert-butyl chloride, methyl bromide, ethyl bromide, n-propyl bromide, isopropyl bromide, n-butyl bromide, sec-butyl bromide, tert-butyl bromide, etc.

Compound (1a') is a tautomeric compound as shown below.

[Chemical Formula 5]

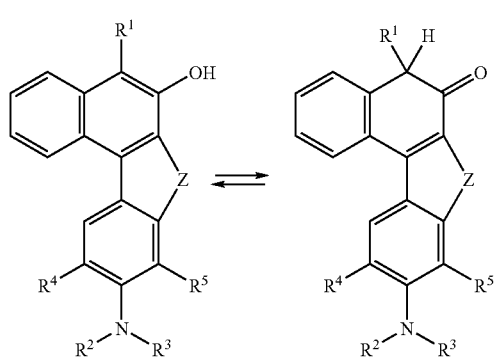

The heteropolycyclic compound of General Formula (2) of the present invention can be produced, for example, as shown in Reaction Scheme-3 given below. That is, the heteropolycyclic compound of General Formula (2) wherein X is a hydroxy group (this compound is hereinafter referred to as "Compound (2a)") can be produced by reacting a heteropolycyclic compound of General Formula (4) with a compound of General Formula (5). Further, a heterocyclic compound of General Formula (2) wherein X is a group other than a hydroxy group (this compound is hereinafter referred to as "Compound (2b)") can be produced by substituting the hydroxy group in Compound (2a) with another group.

Reaction Scheme-3

[Chemical Formula 6]

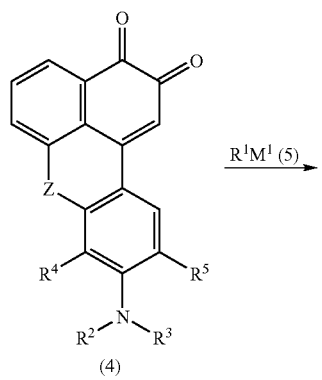

-continued

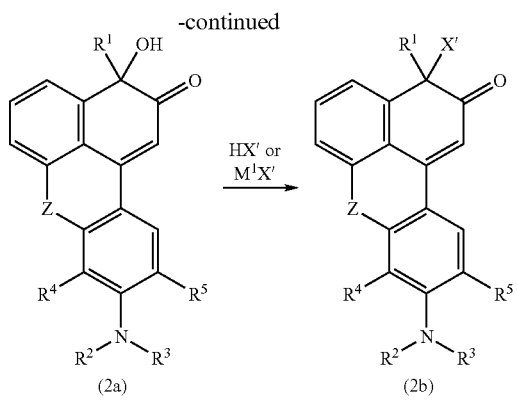

wherein $R^1$, $R^2$, $R^3$, $R^4$, $R^5$, X', Z and $M^1$ are as defined above.

The heteropolycyclic compound of General Formula (4) is a new compound, and can be produced, for example, by the method shown in Reaction Scheme-6 given below.

The reactions for obtaining Compounds (2a) and (2b) from the heteropolycyclic compound of General Formula (4) can be performed in the same manner as the above-mentioned reactions for obtaining Compounds (1a) and (1b) from the heteropolycyclic compound of General Formula (3).

Compound (2b) in which X' is a straight- or branched-chain $C_1$-$C_{10}$ alkyl group can also be produced by reducing Compound (2a), followed by alkylation of the resulting Compound (2a'), as shown in Reaction Scheme-4 given below:

Reaction Scheme-4

[Chemical Formula 7]

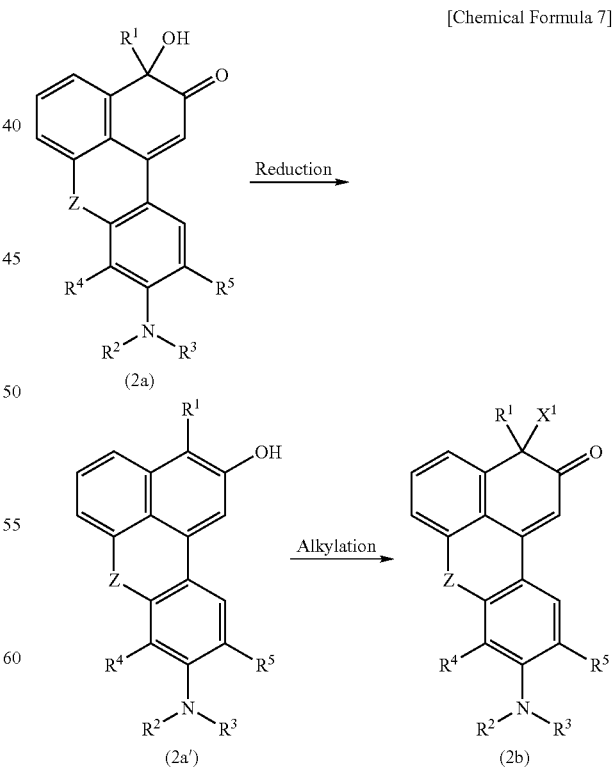

wherein $R^1$, $R^2$, $R^3$, $R^4$, $R^5$, $X^1$ and Z are as defined above.

A wide variety of reaction conditions for known reduction reactions using reducing agents can be applied to the reduction of Compound (2a). Usable reducing agents include, for example, palladium-carbon and the like. Usable reaction solvents include, for example, ethanol and like alcohols.

The subsequent alkylation of Compound (2a') is carried out by reacting Compound (2a') with an alkylating agent in the presence of a strong base. Examples of strong bases include lithium tert-butoxide, sodium tert-butoxide, etc. Examples of alkylating agents include methyl chloride, ethyl chloride, n-propyl chloride, isopropyl chloride, n-butyl chloride, sec-butyl chloride, tert-butyl chloride, methyl bromide, ethyl bromide, n-propyl bromide, isopropyl bromide, n-butyl bromide, sec-butyl bromide, tert-butyl bromide, etc.

Compound (2a') is a tautomeric compound, as shown below.

The heteropolycyclic compound of General Formula (3) can be produced by reacting a known sulfonate represented by General Formula (6) with a known aniline represented by General Formula (7).

The reaction of the sulfonate of General Formula (6) with the aniline of General Formula (7) can be performed, for example, in the presence of a copper (II) halide in a suitable solvent. A wide variety of known solvents can be used as long as they do not adversely affect the reaction. Examples of usable solvents include acetic acid and like organic acids, and mixed solvents of an organic acid and water. The mole ratio of the sulfonate of General Formula (6) to the aniline of General Formula (7) is not limited, and is usually about 1:1 to about 1:2, and is preferably about 1:1.2 to about 1:1.5. The reaction can be carried out either at room temperature or with heating, and preferably at room temperature.

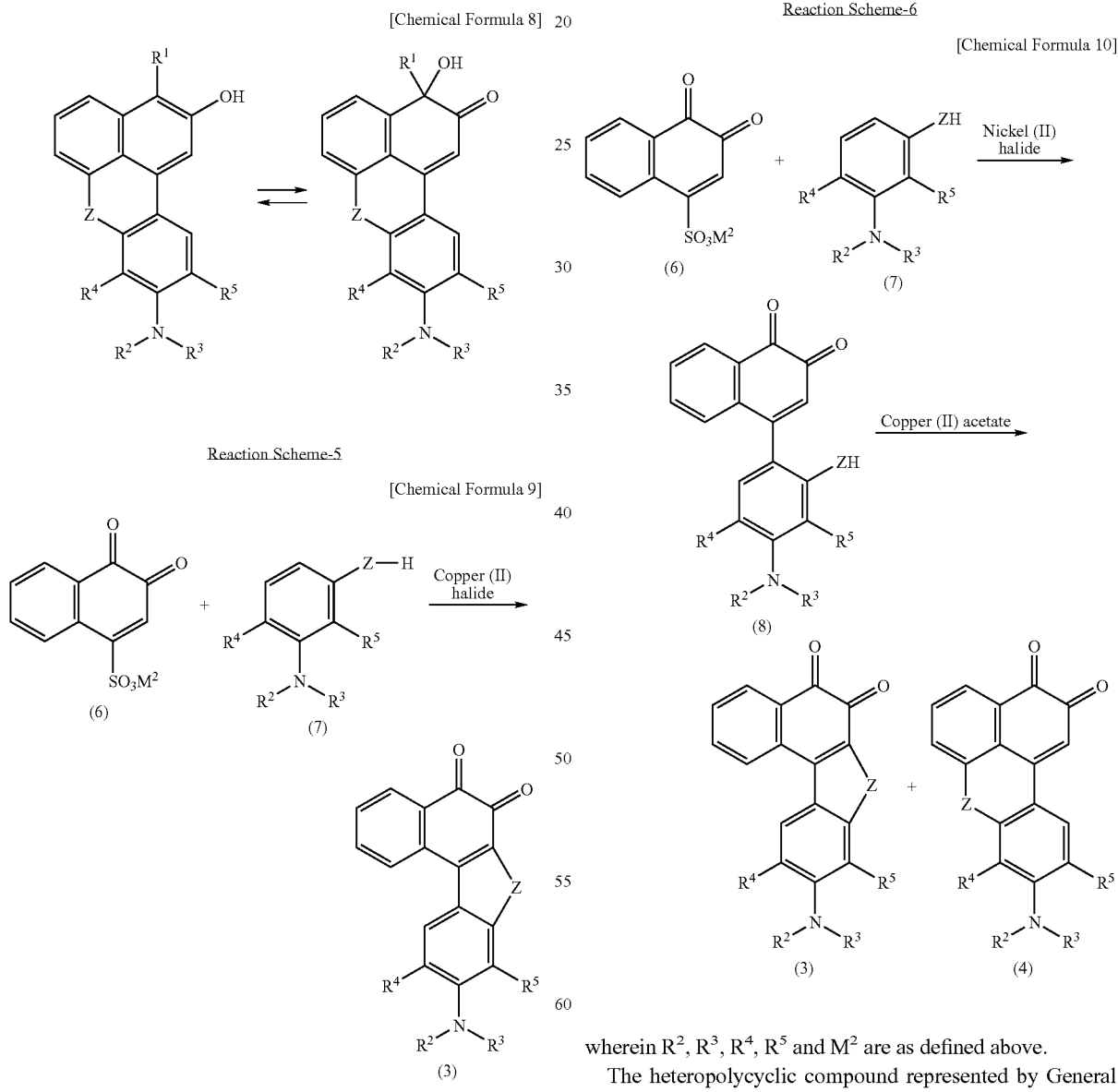

wherein $R^2$, $R^3$, $R^4$, $R^5$ and Z are as defined above, and $M^2$ is an alkali metal atom.

wherein $R^2$, $R^3$, $R^4$, $R^5$ and $M^2$ are as defined above.

The heteropolycyclic compound represented by General Formula (4) can be obtained by reacting a known sulfonate represented by General Formula (6) with a known aniline represented by General Formula (7), followed by cyclization of the resulting compound represented by General Formula (8). The cyclization of the compound of General Formula (8) forms the heteropolycyclic compound of General Formula (3) as a byproduct.

The reaction of the sulfonate of General Formula (6) with the aniline of General Formula (7) can be performed, for example, in the presence of nickel (II) halide in a suitable solvent. A wide variety of known solvents can be used as long as they do not adversely affect the reaction. Examples of usable solvents include dimethylformamide (DMF) and the like. The mole ratio of the sulfonate of General Formula (6) to the aniline of General Formula (7) is not limited, and is usually about 1:1 to about 1:2 mol, and is preferably about 1:1.2 to about 1:1.5. The nickel halide is usually used in an amount of about 0.9 to about 1.1 mol per mol of the sulfonate of General Formula (6). The reaction can be carried out either at room temperature or with heating, and preferably at about 40 to about 60° C.

The reaction for obtaining the compound of General Formula (4) from the compound of General Formula (8) can be performed, for example, in the presence of copper (II) acetate in a suitable solvent. A wide variety of known solvents can be used as long as they do not adversely affect the reaction. Examples of usable solvents include dimethyl sulfoxide (DMSO) and the like.

Copper (II) acetate is used in an amount of about 0.9 to about 1.1 mol per mol of compound of General Formula (8). The reaction can be carried out either at room temperature or with heating, and preferably at about 90 to about 110° C.

Compounds formed according to the above reaction schemes can be isolated and purified from the reaction mixtures by isolation and purification methods known in this field. Examples of such isolation and purification methods include extraction, concentration, filtration, column chromatography, etc.

Colorant

The heteropolycyclic compound of General Formula (1) and the heteropolycyclic compound of General Formula (2) of the present invention have the following excellent properties.

(1) The compounds of the present invention have appropriate optical absorption wavelengths and luminescence wavelengths.
(2) The compounds of the present invention can be easily produced from inexpensive, readily available compounds.
(3) The compounds of the present invention are highly soluble in various organic solvents such as, for example, alcohol solvents, ketone solvents, ester solvents, halogenated hydrocarbon solvents, aliphatic hydrocarbon solvents, aromatic hydrocarbon solvents, etc.
(4) The compounds of the present invention have high luminous efficiencies, excellent heat resistance, excellent light resistance, and excellent dispersibility in resist materials.
(5) The compounds of the present invention have strong luminescence (fluorescence), not only in solution but also in the solid state.
(6) The compounds of the present invention in the solid state can be adjusted in fluorescence color (blue, green or red) and solubility in solvents by changing the kind of substituent X.

Therefore, the present invention also provides a colorant comprising at least one member selected from the group consisting of the heteropolycyclic compounds represented by General Formulae (1) and (2).

The heteropolycyclic compounds of General Formulae (1) and (2) have excellent color conversion efficiencies, and can be used advantageously for producing color conversion filters.

Further, the heteropolycyclic compounds of General Formulae (1) and (2) of the present invention can be used as colorants for producing dye-sensitized solar cells; heat transfer colorants, inkjet colorants and like reprographic materials; electrophotographic toners and like electrically charged colorants; optical modulation elements and like nonlinear optical materials; colorants for organic solar cells and like photoelectric conversion devices; and fluorescent colorants (color conversion colorants) for electroluminescent devices, dye lasers, etc., colorants for agricultural and horticultural films, and like wavelength conversion materials.

More specifically, the heteropolycyclic compounds of General Formulae (1) and (2) of the present invention can be used by themselves as fluorescent organic colorants that emit light in the solid state, and can also be used as coloring materials for dispersed dyes, heat transfer colorants, etc., and as luminescent materials for organic electroluminescent devices, and the like.

Some of the heteropolycyclic compounds of General Formulae (1) and (2) of the present invention have clathrate-forming abilities, and such compounds can incorporate various organic guest molecules in their cavities to form inclusion complexes. The formation of inclusion complexes improves various functions (e.g., luminescence in the solid state) as fluorescent organic colorants.

Pigment and Dye

The heteropolycyclic compounds of General Formulae (1) and (2) of the present invention and inclusion complexes thereof can be made into pigments or dyes by dispersion or dissolution in suitable solvents.

A wide variety of known solvents used in the field of pigments and dyes are usable.

Specific examples of solvents for pigments include n-pentane, n-hexane, n-heptane and like aliphatic hydrocarbon solvents; benzene, toluene, xylene, ethylbenzene and like aromatic hydrocarbon solvents; methyl isobutyl ketone, cyclohexanone and like ketone solvents; propylene glycol monomethyl ether, cellosolve, ethyl carbinol and like glycol ether solvents; and propylene glycol monomethyl ether ethyl acetate, butyl cellosolve ethyl acetate, butyl carbinol ethyl acetate and like acetate solvents. Examples of solvents for dyes include conventional low-molecular-weight organic solvents, glycols, glycol ether solvents, etc.

The content of heteropolycyclic compound of the present invention in a pigment or dye is not limited, and is usually about 5 to about 30 wt. %, and preferably about 8 to about 15 wt. % of the pigment or dye.

The pigment and dye of the present invention can be produced by conventional methods in this field.

EFFECT OF THE INVENTION

The heteropolycyclic compounds of General Formulae (1) and (2) of the present invention and inclusion complexes thereof can be used not only as dyes and pigments, but also as fluorescent organic colorants in various applications, such as fluorescent conversion membranes in various displays; dye lasers; light control; energy conversion; high-density optical recording; displays; fluorescent sensors for molecular recognition; etc.

Specific applications of fluorescent conversion membranes include PDPs (plasma display panels), ELD (electroluminescence displays), LEDs (light-emitting diodes), VFDs (vacuum fluorescent displays), etc.

As with the heteropolycyclic compounds of General Formulae (1) and (2), the heteropolycyclic compounds of General Formulae (3) and (4) can be used as colorants for producing dye-sensitized solar cells; heat transfer colorants, inkjet colorants and like reprographic materials; electrophotographic toners and like electrically charged colorants; optical modulation elements and like nonlinear optical materials; etc.

BEST MODE FOR CARRYING OUT THE INVENTION

The following Reference Examples and Examples are given to illustrate the invention in further detail.

REFERENCE EXAMPLE 1

Synthesis of a 5-membered Heterocyclic Ring Compound of General Formula (3) wherein Z is O, $R^2$ and $R^3$ are n-butyl, and $R^4$ and $R^5$ are H Sodium 1,2-naphthoquinone-4-sulfonate (1.0 g, $3.84 \times 10^{-3}$ moles) and $CuCl_2$ (0.26 g, $1.92 \times 10^{-3}$ moles) were placed in a mortar and dissolved in a small amount of an aqueous acetic acid solution. Subsequently, m-(dibutylamino)phenol (0.85 g, $3.84 \times 10^{-3}$ moles) dissolved in a small amount of an aqueous acetic acid solution was added and mixed in the mortar. The mixture was left to stand for several days to allow the reaction to proceed. After addition of water, the precipitate was collected by filtration and dried under reduced pressure.

The precipitate was extracted using dichloromethane. The dichloromethane extract was concentrated and the residue was subjected to silica gel column chromatography (eluent: dichloromethane/ethyl acetate=6/1) for separation and purification, thus giving 0.586 g (yield: 40.9%) of purple powdery crystals of a 5-membered heterocyclic ring compound of General Formula (3) wherein Z is O, $R^2$ and $R^3$ are n-butyl and $R^4$ and $R^5$ are H.

M.p.: 149-153° C. $^1$H-NMR spectrum ($CDCl_3$) δ ppm: 1.00 (6H, t), 1.37-1.50 (4H, m), 1.62 to 1.74 (4H, m), 3.34 (4H, t), 6.65 (1H, s), 6.80 (1H, dd), 7.43 (1H, dt), 7.65 (1H, dt), 7.88 (1H, d), 7.93 (1H, d), 8.11 (1H, d) IR spectrum (KBr): 1618 cm$^{-1}$ Optical absorption characteristics $\lambda_{max}$/nm ($\epsilon_{max}$/dm$^3$ mol$^{-1}$ cm$^{-1}$): 410 (7800), 533 (10800)

REFERENCE EXAMPLE 2

Synthesis of a 5-membered Heterocyclic Ring Compound of General Formula (3) wherein Z is NH, $R^2$ and $R^3$ are n-butyl, and $R^4$ and $R^5$ are H Sodium 1,2-naphthoquinone-4-sulfonate (2.60 g, $1.00 \times 10^{-2}$ moles), N,N-dibutyl-3-aminoaniline (2.20 g, $1.00 \times 10^{-2}$ moles) and nickel acetate tetrahydrate (2.49 g, $1.00 \times \times 10^{-2}$ moles) were dissolved in 40 ml of an aqueous acetic acid solution (acetic acid:water=4:1) and stirred at room temperature (25° C.) for 44 hours. Progress of the reaction was monitored by silica gel thin layer chromatography (eluent: dichloromethane/ethyl acetate=10/1). When the spot of N,N-dibutyl-3-aminoaniline on the silica gel thin layer chromatograph had disappeared, the reaction was terminated.

After the reaction, water was added to the reaction mixture, and the mixture was filtered. The material collected by filtration was extracted using methylene chloride. The methylene chloride extract was concentrated and the residue was subjected to silica gel column chromatography (eluent: n-hexane/ethyl acetate=2/1) for separation and purification, thus giving 0.295 g (yield: 7.9%) of green crystals of a 5-membered heterocyclic ring compound of General Formula (3) wherein Z is NH, $R^2$ and $R^3$ are n-butyl, and $R^4$ and $R^5$ are H.

$^1$H-NMR spectrum (DMSO-$d_6$) δ ppm: 0.92 (6H, t), 1.31-1.36 (4H, m), 1.53-1.56 (4H, m), 3.35 (4H, t), 6.39 (1H, d), 6.81 (1H, dd), 7.30 (1H, t), 7.61 (1H, t), 7.81 (1H, t), 8.01 (2H, m) IR spectrum (KBr): 3229, 1604 cm$^{-1}$ Optical absorption characteristics $\lambda_{max}$/nm ($\epsilon_{max}$/dm$^3$ mol$^{-1}$ cm$^{-1}$): 582 (6200), 453 (11100), 282 (36500), 271 (35700)

REFERENCE EXAMPLE 3

Synthesis of a 6-membered Heterocyclic Ring Compound of General Formula (4) wherein Z is O, $R^2$ and $R^3$ are n-butyl, and $R^4$ and $R^5$ are H (1) Production of a compound of General Formula (8) wherein Z is O, $R^2$ and $R^3$ are n-butyl, and $R^4$ and $R^5$ are H Sodium 1,2-naphthoquinone-4-sulfonate (1.0 g, $3.84 \times 10^{-3}$ moles), N,N-butyl-3-aminophenol (1.28 g, $4.01 \times 10^{-3}$ moles) and $NiCl_2$ (0.5 g, $3.84 \times 10^{-3}$ moles) were dissolved in 45 ml of DMF, and heated at 50° C. with stirring for 3 hours. After the reaction, the reaction mixture was poured into 300 ml of ion-exchanged water and the precipitate was collected by filtration. The material collected by filtration was extracted using methylene chloride. The extract was concentrated under reduced pressure and the residue was subjected to silica gel column chromatography (eluent: dichloromethane/ethyl acetate=20/1) for separation and purification, thus giving 0.77 g (yield: 53.1%) of blue powdery crystals of a compound of General Formula (8) wherein Z is O, $R^2$ and $R^3$ are n-butyl, and $R^4$ and $R^5$ are H.

M.p.: 142-144° C. $^1$H-NMR spectrum ($CDCl_3$) δ ppm: 0.98 (6H, t), 1.24-1.43 (4H, m), 1.58-1.66 (4H, m), 3.31. (4H, t), 5.37 (1H, s), 6.23 (1H, d), 6.33 (1H, dd), 6.51 (1H, s), 7.07 (1H, d), 7.45 (1H, dd), 7.49 (1H, td), 7.59 (1H, td), 8.15 (1H, dd) IR spectrum (KBr): 1605, 1694, 3374 cm$^{-1}$ Optical absorption characteristics $\lambda_{max}$/nm ($\epsilon_{max}$/dm$^3$ mol$^{-1}$ cm$^{-1}$): 504 (3860) 409 (4080)

(2) Production of a 6-membered Heterocyclic Ring Compound of General Formula (4) wherein Z is O, $R^2$ and $R^3$ are n-butyl, and $R^4$ and $R^5$ are H The above-obtained compound of General Formula (8) wherein Z is O, $R^2$ and $R^3$ are n-butyl, and $R^4$ and $R^5$ are H (2.07 g, 5.49 mmoles) and anhydrous copper acetate (995 mg, 5.49 mmoles) were dissolved in 60 ml of DMSO, and heated at 100° C. with stirring for 11 hours. After the reaction, the reaction mixture was poured into 400 ml of distilled water, and the precipitate was collected by filtration. The precipitate was subjected to silica gel column chromatography (eluent: dichloromethane/ethyl acetate=10/1) for separation and purification, thus giving 1.27 g (yield: 61.7%) of blue powdery crystals of a 6-membered heterocyclic ring compound of General Formula (4) wherein Z is O, $R^2$ and $R^3$ are n-butyl, and $R^4$ and $R^5$ are H, together with 0.22 g (yield: 10.4%) of purple powdery crystals of a 5-membered heterocyclic ring compound of General Formula (3) wherein Z is O, $R^2$ and $R^3$ are n-butyl, and $R^4$ and $R^5$ are H.

Physical properties of the 6-membered heterocyclic ring compound of General Formula (4) wherein Z is O, $R^2$ and $R^3$ are n-butyl, and $R^4$ and $R^5$ are H.

M.p.: 132-133° C. $^1$H-NMR spectrum ($CDCl_3$) δ ppm: 0.97 (6H, t), 1.34-1.43 (4H, m), 1.57-1.65 (4H, m), 3.34 (4H, t), 6.20 (1H, d), 6.50 (1H, s), 6.58 (1H, dd), 7.39 (1H, dd), 7.49

(1H, dd), 7.56 (1H, d), 7.89 (1H, d) IR spectrum (KBr): 1221, 1594, 1689 cm$^{-1}$ Optical absorption characteristics $\lambda_{max}$/nm ($\epsilon_{max}$/dm$^3$ mol$^{-1}$ cm$^{-1}$): 530 (12000) 437 (7900)

EXAMPLE 1

Production of a 5-membered Heterocyclic Ring Compound of General Formula (1) wherein Z is O, R$^1$ is methyl, X is OH, R$^2$ and R$^3$ are n-butyl, and R$^4$ and R$^5$ are H The 5-membered heterocyclic ring compound of General Formula (3) wherein Z is O, R$^2$ and R$^3$ are n-butyl, and R$^4$ and R$^5$ are H (2.0 g, 5.36×10$^{-3}$ moles) obtained in Reference Example 1 was dissolved in 200 ml of anhydrous THF under an argon gas atmosphere. After the solution was cooled to −108° C., a 2.0 M methyl lithium-diethyl ether solution (3.1 ml, 6.97×10$^{-3}$ moles) was added via syringe. The mixture was stirred under the cooling condition for 15 minutes and then at room temperature for 15 minutes. After the reaction, a saturated aqueous ammonium chloride solution was added to quench the mixture. After removing the solvent under reduced pressure, water was added to the residue, and the mixture was filtered. The material collected by filtration was extracted using methylene chloride. The methylene chloride extract was washed with water and then concentrated under reduced pressure. The residue was subjected to silica gel column chromatography (eluent: methylene chloride/ethyl acetate=10/1) for separation and purification, thus giving 1.37 g (yield: 65%) of yellow crystals of a 5-membered heterocyclic ring compound of General Formula (1) wherein Z is O, R$^1$ is methyl, X is OH, R$^2$ and R$^3$ are n-butyl, and R$^4$ and R$^5$ are H.

M.p.: 150-153° C. $^1$H-NMR spectrum (CDCl$_3$) δ ppm: 0.99 (6H, t), 1.35-1.45 (4H, m), 1.59-1.70 (4H, m), 1.66 (3H, s), 3.36-3.40 (4H, t), 3.71 (1H, s), 6.73 (1H, d), 6.83 (1H, dd), 7.44 (2H, td), 7.80 (1H, dd), 7.96 (1H, d), 8.03 (1H, dd) IR spectrum (KBr): 1644, 3432 cm$^{-1}$ Optical absorption characteristics $\lambda_{max}$/nm ($\epsilon_{max}$/dm$^3$ mol$^{-1}$ cm$^{-1}$): 334 (8200), 421 (21300) Fluorescence characteristics $\lambda_{em}$: 478 nm

EXAMPLE 2

Production of a 5-membered Heterocyclic Ring Compound of General Formula (1) wherein Z is O, R$^1$ is n-butyl, X is OH, R$^2$ and R$^3$ are n-butyl, and R$^4$ and R$^5$ are H The 5-membered heterocyclic ring compound of General Formula (3) wherein Z is O, R$^2$ and R$^3$ are n-butyl, and R$^4$ and R$^5$ are H (2.0 g, 5.36×10$^{-3}$ moles) obtained in Reference Example 1 was dissolved in 200 ml of anhydrous THF under an argon gas atmosphere. After the solution was cooled to −108° C., a 1.6 M butyl lithium-diethyl ether solution (4.4 ml, 6.97×10$^{-3}$ moles) was added via syringe. The mixture was stirred under the cooling condition for 15 minutes and then at room temperature for 15 minutes. After the reaction, a saturated aqueous ammonium chloride solution was added to quench the mixture. After removing the solvent under reduced pressure, water was added to the residue and the mixture was filtered. The material collected by filtration was extracted using methylene chloride. The methylene chloride extract was washed with water and then concentrated under reduced pressure. The residue was subjected to silica gel column chromatography (eluent: hexane/ethyl acetate=5/2) for separation and purification, thus giving 0.960 g (yield: 41%) of yellow crystals of a 5-membered heterocyclic ring compound of General Formula (1) wherein Z is O, R$^1$ is n-butyl, X is OH, R$^2$ and R$^3$ are n-butyl, and R$^4$ and R$^5$ are H.

M.p.: 128-131° C. $^1$H-NMR spectrum (CDCl$_3$) δ ppm: 0.74 (3H, t), 0.99 (6H, t), 1.08-1.18 (2H, m), 1.35-1.54 (4H, m), 1.60-1.68 (6H, m), 1.81-2.00 (2H, m), 3.38 (4H, t), 3.74 (1H, s), 6.73 (1H, d), 6.83 (1H, dd), 7.40-7.45 (2H, m), 7.74 (1H, dd), 7.96 (1H, d), 8.02 (1H, dd) IR spectrum (KBr): 1645, 3406 cm$^{-1}$ Optical absorption characteristics $\lambda_{max}$/nm ($\epsilon_{max}$/dm$^3$ mol$^{-1}$ cm$^{-1}$): 337 (6800), 423 (17800) Fluorescence characteristics $\lambda_{em}$: 477 nm

EXAMPLE 3

Production of a 5-membered Heterocyclic Ring Compound of General Formula (1) wherein Z is O, R$^1$ is phenyl, X is OH, R$^2$ and R$^3$ are n-butyl, and R$^4$ and R$^5$ are H The 5-membered heterocyclic ring compound of General Formula (3) wherein Z is O, R$^2$ and R$^3$ are n-butyl, and R$^4$ and R$^5$ are H (1.0 g, 2.68×10$^{-3}$ moles) obtained in Reference Example 1 was dissolved in 200 ml of anhydrous THF under an argon gas atmosphere. After the solution was cooled to −108° C., a 1.8 M phenyl lithium-diethyl ether solution (1.5 ml, 2.68×10$^{-3}$ moles) was added via syringe. The mixture was stirred under the cooling condition for 15 minutes and then at room temperature for 15 minutes. After the reaction, a saturated aqueous ammonium chloride solution was added to quench the mixture. After removing the solvent under reduced pressure, water was added to the residue and the mixture was filtered. The material collected by filtration was extracted using methylene chloride. The methylene chloride extract was washed with water and then concentrated under reduced pressure. The residue was subjected to silica gel column chromatography (eluent: benzene/acetone=10/1) for separation and purification, thus giving 0.216 g (yield: 18%) of orange-yellow crystals of a 5-membered heterocyclic ring compound of General Formula (1) wherein Z is O, R$^1$ is phenyl, X is OH, R$^2$ and R$^3$ are n-butyl, R$^4$ and R$^5$ are H.

M.p.: 164-168° C. $^1$H-NMR spectrum (CDCl$_3$) δ ppm: 0.98 (6H, t), 1.30-1.60 (8H, m), 3.37 (4H, t), 4.53 (1H, s), 6.68 (1H, d), 6.86 (1H, s), 7.17-7.22 (3H, m), 7.34-7.38 (2H, m), 7.39-7.47 (2H, m), 7.61 (1H, d), 8.00 (1H, d), 8.08 (1H, d) IR spectrum (KBr): 1652, 3449 cm$^{-1}$ Optical absorption characteristics $\lambda_{max}$/nm ($\epsilon_{max}$/dm$^3$ mol$^{-1}$ cm$^{-1}$): 341 (7700), 430 (21600) Fluorescence characteristics $\lambda_{em}$: 486 nm

EXAMPLE 4

Production of a 6-membered Heterocyclic Ring Compound of General Formula (2) wherein Z is O, R$^1$ is methyl, X is OH, R$^2$ and R$^3$ are n-butyl, and R$^4$ and R$^5$ are H The 6-membered heterocyclic ring compound of General Formula (3) wherein Z is O, R$^2$ and R$^3$ are n-butyl, and R$^4$ and R$^5$ are H (1.0 g, 2.66×10$^{-3}$ moles) obtained in Reference Example 3 was dissolved in 200 ml of anhydrous THF under an argon gas atmosphere. After the solution was cooled to −108° C., a 1.0 M methyl lithium-diethyl ether solution (3.1 ml, 3.19×10$^{-3}$ moles) was added via syringe. The resulting mixture was stirred under the cooling condition for 15 minutes and then at room temperature for 15 minutes. After the reaction, a saturated aqueous ammonium chloride solution was added to quench the mixture. After removing the solvent under reduced pressure, water was added to the residue and the mixture was filtered. The material collected by filtration was extracted using methylene chloride. The methylene chloride extract was washed with water and then concentrated under reduced pressure. The residue was subjected to silica gel column chromatography (eluent: hexane/ethyl acetate=1/1) for separation and purification, thus giving 0.53 g of yellow crystals of a 6-membered heterocyclic ring compound of General Formula (2) wherein Z is O, R$^1$ is methyl, X is OH, R$^2$ and R$^3$ are n-butyl, and R$^4$ and R$^5$ are H.

M.p.: 113-116° C. $^1$H-NMR spectrum (acetone-$d_6$) δ ppm: 0.98 (6H, t), 1.38-1.44 (4H, m), 1.47 (3H, s), 1.63-1.71 (4H, m), 3.50 (4H, t), 4.86 (1H, s), 6.07 (1H, d), 6.24 (1H, s), 6.82 (1H, dd), 7.22 (1H, dd), 7.53 (1H, dd), 7.59 (1H, dd), 7.87 (1H, dd) IR spectrum (KBr): 1254, 1643, 3432 cm$^{-1}$ Optical absorption characteristics $\lambda_{max}$/nm ($\epsilon_{max}$/dm$^3$ mol$^{-1}$ cm$^{-1}$): 418 (31600), 438 (31500) Fluorescence characteristics $\lambda_{em}$: 462 nm

EXAMPLE 5

Production of a 6-membered Heterocyclic Ring Compound of General Formula (2) wherein Z is O, $R^1$ is n-butyl, X is OH, $R^2$ and $R^3$ are n-butyl, and $R^4$ and $R^5$ are H The 6-membered heterocyclic ring compound of General Formula (4) wherein Z is O, $R^2$ and $R^3$ are n-butyl, and $R^4$ and $R^5$ are H (2.0 g, 5.32×10$^{-3}$ moles) obtained in Reference Example 3 was dissolved in 200 ml of anhydrous THF under an argon gas atmosphere. After the solution was cooled to −108° C., a 1.6 M butyl lithium-diethyl ether solution (4.4 ml, 6.97×10$^{-3}$ moles) was added via syringe. The mixture was stirred under the cooling condition for 15 minutes and then at room temperature for 15 minutes. After the reaction, a saturated aqueous ammonium chloride solution was added and the mixture was concentrated under reduced pressure. After addition of water, the mixture was filtered. The material collected by filtration was extracted using methylene chloride. After washing with water, the methylene chloride layer was dried to a solid under reduced pressure and subjected to silica gel column chromatography (eluent: methylene chloride/ethyl acetate=10/1) for separation and purification, thus giving 0.960 g (yield: 41.5%) of yellow crystals of a 6-membered heterocyclic ring compound of General Formula (2) wherein Z is O, $R^1$ is n-butyl, X is OH, $R^2$ and $R^3$ are n-butyl, and $R^4$ and $R^5$ are H.

M.p.: 125-127° C. $^1$H-NMR spectrum (acetone-$d_6$) δ ppm: 0.77 (3H, t), 0.98 (6H, t), 1.08-1.29 (4H, m), 1.38 to 1.48 (4H, m), 1.63-1.80 (6H, m), 3.49 (4H, t), 4.44 (1H, s), 6.24 (1H, s), 6.51 (1H, d), 6.82 (1H, dd), 7.22 (1H, dd), 7.49 (1H, dd), 7.58 (1H, t), 7.87 (1H,d) IR spectrum (KBr): 1224, 1643, 3432 cm$^{-1}$ Optical absorption characteristics $\lambda_{max}$/nm ($\epsilon_{max}$/dm$^3$ mol$^{-1}$ cm$^{-1}$): 420 (29700), 438 (29300) Fluorescence characteristics $\lambda_{em}$: 463 nm

EXAMPLE 6

Production of a 6-membered Heterocyclic Ring Compound of General Formula (2) wherein Z is O, $R^1$ is phenyl, X is OH, $R^2$ and $R^3$ are n-butyl, and $R^4$ and $R^5$ are H The 6-membered heterocyclic ring compound of General Formula (4) wherein Z is O, $R^2$ and $R^3$ are n-butyl, and $R^4$ and $R^5$ are H (2.0 g, 5.32×10$^{-3}$ moles) obtained in Reference Example 3 was dissolved in 200 ml of anhydrous THF under an argon gas atmosphere. After the solution was cooled to −108° C., a 0.94 M phenyl lithium-diethyl ether solution (6.8 ml, 6.4×10$^{-3}$ moles) was added via syringe in an argon gas atmosphere. The resulting mixture was stirred under the cooling condition for 15 minutes and then at room temperature for 15 minutes. After the reaction, a saturated aqueous ammonium chloride solution was added to quench the mixture. After removing the solvent under reduced pressure, water was added to the residue and the mixture was filtered. The material collected by filtration was extracted using methylene chloride. The methylene chloride extract was washed with water and then concentrated under reduced pressure. The residue was subjected to silica gel column chromatography (eluent: methylene chloride/ethyl acetate=10/1) for separation and purification, thus giving 0.33 g (yield: 13.7%) of red-brown crystals of a 6-membered heterocyclic ring compound of General Formula (2) wherein Z is O, $R^1$ is phenyl, X is OH, $R^2$ and $R^3$ are n-butyl, and $R^4$ and $R^5$ are H.

M.p.: 175-177° C. 1H-NMR spectrum (acetone-$d_6$) δ ppm: 0.99 (6H, t), 1.40-1.49 (4H, m), 1.65-1.73 (4H, m), 3.52 (4H, t), 5.33 (1H, s), 6.24 (1H, s), 6.56 (1H, d), 6.85 (1H, dd), 7.15-7.23 (3H, m), 7.29 (1H, dd), 7.34-7.37 (2H, m), 7.42 (1H, dd), 7.57 (1H, dd) 7.89 (1H, d) IR spectrum (KBr): 1222, 1639, 3429 cm$^{-1}$ Optical absorption characteristics $\lambda_{max}$/nm ($\epsilon_{max}$/dm$^3$ mol$^{-1}$ cm$^{-1}$): 426 (28500), 446 (31200) Fluorescence characteristics $\lambda_{em}$: 470 nm

EXAMPLE 7

Production of a 5-membered Heterocyclic Ring Compound of General Formula (1) wherein Z is NH, $R^1$ is methyl, X is OH, $R^2$ and $R^3$ are n-butyl, and $R^4$ and $R^5$ are H The 5-membered heterocyclic ring compound of General Formula (3) wherein Z is NH, $R^2$ and $R^3$ are n-butyl, and $R^4$ and $R^5$ are H (1.0 g, 2.68×10$^{-3}$ moles) obtained in Reference Example 2 was dissolved in 200 ml of anhydrous THF under an argon gas atmosphere. After the solution was cooled to −108° C., a 1.0 M methyl lithium-diethyl ether solution (6.4 ml, 6.40×10$^{-3}$ moles) was added via syringe. The mixture was stirred under the cooling condition for 15 minutes and then at room temperature for 15 minutes. After the reaction, a saturated aqueous ammonium chloride solution was added to quench the mixture. After removing the solvent under reduced pressure, water was added to the residue and the mixture was filtered. The material collected by filtration was extracted using methylene chloride. The methylene chloride extract was washed with water and then concentrated. The residue was subjected to silica gel column chromatography (eluent: methylene chloride/ethyl acetate=2/1) for separation and purification, thus giving 0.362 g (yield: 34.6%) of yellow crystals of a 5-membered heterocyclic ring compound of General Formula (1) wherein Z is NH, $R^1$ is methyl, X is OH, $R^2$ and $R^3$ are n-butyl, and $R^4$ and $R^5$ are H.

M.p.: 137-140° C. $^1$H-NMR spectrum (acetone-$d_6$) δ ppm: 0.98 (6H, t), 1.37-1.47 (4H, m), 1.56 (3H, s), 1.60-1.70 (4H, m), 3.44 (4H, t), 4.52 (1H, s), 6.72 (1H, dd), 6.90 (1H, dd), 7.32 (1H, td), 7.40 (1H, td), 7.76 (1H, dd), 8.12 (1H, d), 8.17 (1H, d), 10.55 (1H, s) IR spectrum (KBr): 1601, 3251, 3399 cm$^{-1}$ Optical absorption characteristics $\lambda_{max}$/nm ($\epsilon_{max}$/dm$^3$ mol$^{-1}$ cm$^{-1}$): 426 (14000), 376 (13200) Fluorescence characteristics $\lambda_{em}$: 477 nm

EXAMPLE 8

Production of a 5-membered Heterocyclic Ring Compound of General Formula (1) wherein Z is O, $R^1$ is n-butyl, X is n-butyl, $R^2$ and $R^3$ are n-butyl, and $R^4$ and $R^5$ are H The 5-membered heterocyclic ring compound of General Formula (1) wherein Z is O, $R^1$ is n-butyl, X is OH, $R^2$ and $R^3$ are n-butyl, and $R^4$ and $R^5$ are H (0.14 g, 3.23×10$^{-4}$ moles) obtained in Example 2, and 10% palladium/carbon (20 mg) were added to 10 ml of a THF-ethanol mixture (1:1) under a hydrogen gas atmosphere, and stirred at room temperature for 10 hours. After the reaction, the reaction mixture was filtered. The solvent was removed from the filtrate under reduced pressure, thus giving 130 mg (yield: 97%) of a 5-membered heterocyclic ring compound of General Formula (1a') wherein Z is O, $R^1$ is n-butyl, $R^2$ and $R^3$ are n-butyl, and $R^4$ and $R^5$ are H.

$^1$H-NMR spectrum (acetone-d$_6$) δ ppm: 0.87-1.00 (9H, m), 1.29-1.53 (12H, m), 3.15-3.43 (6H, m), 6.92-7.09 (3H, m), 7.21-7.29 (2H, m), 7.35-7.44 (1H, m), 7.58-7.64 (1H, m)

The above-obtained 5-membered heterocyclic ring compound of General Formula (1a') wherein Z is O, R$^1$ is n-butyl, R$^2$ and R$^3$ are n-butyl, and R$^4$ and R$^5$ are H (0.10 g, 2.39×10$^{-4}$ moles) was dissolved in 10 ml of N-butyl iodide. Subsequently, tert-butyl lithium (0.06 g, 7.50×10$^{-4}$ moles) was added to this solution, and the mixture was stirred at 130° C. for 5 hours. After the reaction, 20 ml of methylene chloride was added to the reaction mixture. The mixture was washed with water and concentrated. The residue was subjected to silica gel column chromatography (eluent: methylene chloride) for separation and purification, thus giving 0.028 g (yield: 24.8%) of yellow crystals of a 5-membered heterocyclic ring compound of General Formula (1) wherein Z is O, R$^1$ is n-butyl, X is n-butyl, R$^2$ and R$^3$ are n-butyl, and R$^4$ and R$^5$ are H.

$^1$H-NMR spectrum (acetone-d$_6$) δ ppm: 0.66 (6H, t), 0.80-0.94 (4H, m), 0.99 (6H, t), 1.03-1.12 (4H, m), 1.33-1.49 (4H, m), 1.62-1.72 (4H, m), 1.91-1.99 (2H, m), 2.18-2.26 (2H, m), 3.50 (4H, t), 6.83 (1H, d), 7.00 (1H, dd), 7.46-7.51 (2H, m), 7.64 (1H, dd), 8.19 (1H, t), 8.25-8.27 (1H, m) IR spectrum (KBr): 1725 cm$^{-1}$ Optical absorption characteristics λ$_{max}$/nm (ε$_{max}$/dm$^3$ mol$^{-1}$ cm$^{-1}$): 335 (19100), 410 (12500) Fluorescence characteristics λ$_{em}$: 452 nm

EXAMPLE 9

Production of a 6-membered Heterocyclic Ring Compound of General Formula (2) wherein Z is O, R1 is n-butyl, X is n-butyl, R$^2$ and R$^3$ are n-butyl, and R$^4$ and R$^5$ are H The 6-membered heterocyclic ring compound of General Formula (2) wherein Z is O, R$^1$ is n-butyl, X is OH, R$^2$ and R$^3$ are n-butyl, and R$^4$ and R$^5$ are H (0.20 g, 4.61×10$^{-4}$ moles) obtained in Example 5, and 10% palladium/carbon (60 mg) were dissolved in 20 ml of a THF-ethanol mixture (1:1) under a hydrogen gas atmosphere, and stirred at room temperature for 10 hours. After the reaction, the reaction mixture was filtered and the solvent was removed from the filtrate under reduced pressure, thus giving 180 mg (yield: 92%) of a 6-membered heterocyclic ring compound of General Formula (2a') wherein Z is O, R$^1$ is n-butyl, R$^2$ and R$^3$ are n-butyl, and R$^4$ and R$^5$ are H.

$^1$H-NMR spectrum (acetone-d$_6$) δ ppm: 0.95 (3H, t), 1.12 (6H, t), 1.08-1.29 (6H, m), 1.38-1.48 (6H, m), 2.63-2.94 (2H, m), 3.32 (4H, t), 6.41 (1H, d), 6.48 (1H, dd), 6.92 (1H, dd), 7.08 (1H, dd), 7.18-7.24 (2H, m), 7.35 (1H, dd)

The above-obtained 6-membered heterocyclic ring compound of General Formula (2a') wherein Z is O, R$^1$ is n-butyl, R$^2$ and R$^3$ are n-butyl, and R$^4$ and R$^5$ are H (0.10 g, 2.39×10$^{-4}$ moles) was dissolved in 10 ml of N-butyl iodide. Subsequently, tert-butyl lithium (0.06 g, 7.50×10$^{-4}$ moles) was added to this solution, and the mixture was stirred at 130° C. for 5 hours. After the reaction, 20 ml of methylene chloride was added to the reaction mixture. The mixture was washed with water and concentrated. The residue was subjected to silica gel column chromatography (eluent: methylene chloride) for separation and purification, thus giving 0.022 g (yield: 19.5%) of yellow crystals of a 6-membered heterocyclic ring compound of General Formula (2) wherein Z is O, R$^1$ is n-butyl, X is n-butyl, R$^2$ and R$^3$ are n-butyl, and R$^4$ and R$^5$ are H.

$^1$H-NMR spectrum (acetone-d$_6$) δ ppm: 0.56 (6H, t), 0.60-0.67 (4H, m), 0.85 (6H, t), 0.91-1.02 (4H, m), 1.25-1.32 (4H, m), 1.49-1.55 (4H, m), 1.63-1.69 (2H, m), 2.00-2.08 (2H, m), 3.35 (4H, t), 6.20 (1H, d), 6.34 (1H, dd), 6.65 (1H, dd), 7.03 (1H, d), 7.22 (1H, d), 7.42 to 7.56 (1H, m), 7.71 (1H, d) IR spectrum (KBr): 1593 cm$^{-1}$ Optical absorption characteristics λ$_{max}$/nm (ε$_{max}$/dm$^3$ mol$^{-1}$ cm$^{-1}$): 407 (28800), 427 (26800) Fluorescence characteristics λ$_{em}$: 448 nm

EXAMPLE 10

Production of a 5-membered Heterocyclic Ring Compound of General Formula (1) wherein Z is O, R$^1$ is methyl, X is acetyloxy, R$^2$ and R$^3$ are n-butyl, and R$^4$ and R$^5$ are H The 5-membered heterocyclic ring compound of General Formula (1) wherein Z is O, R$^1$ is methyl, X is OH, R$^2$ and R$^3$ are n-butyl, and R$^4$ and R$^5$ are H (0.1 g, 2.55×10$^{-4}$ moles) obtained in Example 1, and acetyl chloride (0.06 g, 7.65×10$^{-4}$ moles) were dissolved in 10 ml of anhydrous THF. Sodium carbonate (0.081 g, 7.65×10$^{-4}$ moles) was added to the solution, and the mixture was stirred at 50° C. for 2 days.

After the reaction, 20 ml of methylene chloride was added to the reaction mixture. The mixture was washed with water and concentrated. The residue was subjected to silica gel column chromatography (eluent: methylene chloride) for separation and purification, thus giving 0.077 g (yield: 70%) of yellow crystals of a 5-membered heterocyclic ring compound of General Formula (1) wherein Z is O, R$^1$ is methyl, X is acetyloxy, R$^2$ and R$^3$ are n-butyl, and R$^4$ and R$^5$ are H.

$^1$H-NMR spectrum (CDCl$_3$) δ ppm: 0.98 (6H, t), 1.34-1.44 (4H, m), 1.57 (3H, s), 1.59-1.67 (4H, m), 3.37 (4H, m), 6.74 (1H, d), 6.82 (1H, dd), 7.37-7.50 (3H, m), 7.96 (1H, d), 8.07 (1H, dd) IR spectrum (KBr): 1742, 1619 cm$^{-1}$ Optical absorption characteristics λ$_{max}$/nm (ε$_{max}$/dm$^3$ mol$^{-1}$ cm$^{-1}$): 419 (17000), 332 (7600) Fluorescence characteristics λ$_{em}$: 480 nm

The invention claimed is:

1. A heteropolycyclic compound represented by formula (1):

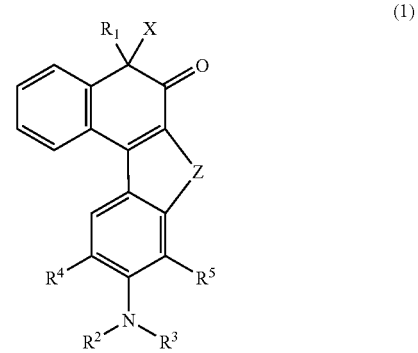

(1)

wherein R$^1$ is a straight- or branched-chain C$_1$-C$_{10}$ alkyl group, a substituted or unsubstituted C$_5$-C$_{10}$ cycloalkyl group or a substituted or unsubstituted phenyl group;

R$^2$ and R$^3$ are the same or different and are each a straight- or branched-chain C$_1$-C$_{10}$ alkyl group, a substituted or unsubstituted C$_5$-C$_{10}$ cycloalkyl group or a substituted or unsubstituted phenyl group, or R$_2$ and R$_3$ may be linked to each other to form, together with the nitrogen atom to which they are attached, a heterocyclic ring;

R$^4$ and R$^5$ are each a hydrogen atom;

X is a straight-chain C$_1$-C$_{10}$ alkyl group, an —OCOR$^6$ group, or an —OR$^6$ group;

$R^6$ is a hydrogen atom, a straight- or branched-chain $C_1$-$C_6$ alkyl group or a substituted or unsubstituted $C_5$-$C_{10}$ cycloalkyl group; and Z is —O— or —$NR^6$— wherein $R^6$ is as defined above.

2. A heteropolycyclic compound according to claim 1, wherein, in formula (1), $R^1$ is a straight- or branched-chain $C_1$-$C_{10}$ alkyl group or a substituted or unsubstituted phenyl group; $R^2$ and $R^3$ are each independently a straight- or branched-chain $C_1$-$C_{10}$ alkyl group; and X a straight-chain $C_1$-$C_{10}$ alkyl group, a hydroxy group or an —$OCOR^6$ group wherein $R^6$ is a hydrogen atom or a straight- or branched-chain $C_1$-$C_6$ alkyl group; and Z is —O— or —$NR^6$— wherein $R^6$ is a hydrogen atom or a straight- or branched-chain $C_1$-$C_6$ alkyl group.

3. A heteropolycyclic compound represented by formula (2):

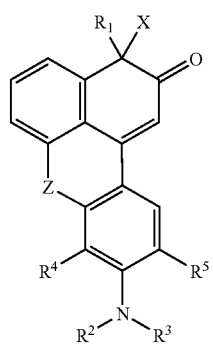

(2)

wherein $R^1$ is a straight- or branched-chain $C_1$-$C_{10}$ alkyl group, a substituted or unsubstituted $C_5$-$C_{10}$ cycloalkyl group or a substituted or unsubstituted phenyl group;

$R^2$ and $R^3$ are the same or different and are each a straight- or branched-chain $C_1$-$C_{10}$ alkyl group, a substituted or unsubstituted $C_5$-$C_{10}$ cycloalkyl group or a substituted or unsubstituted phenyl group, or $R^2$ and $R^3$ may be linked to each other to form, together with the nitrogen atom to which they are attached, a heterocyclic ring;

$R^4$ and $R^5$ are each a hydrogen atom;

X is a straight-chain $C_1$-$C_{10}$ alkyl group, an —$OCOR^6$ group, or an —$OR^6$ group;

$R^6$ is a hydrogen atom, a straight- or branched-chain $C_1$-$C_6$ alkyl group or a substituted or unsubstituted $C_5$-$C_{10}$ cycloalkyl group; and Z is —O— or —$NR^6$— wherein $R^6$ is as defined above.

4. A heteropolycyclic compound according to claim 3, wherein, in formula (2), $R^1$ is a straight- or branched-chain $C_1$-$C_{10}$ alkyl group or a substituted or unsubstituted phenyl group; $R^2$ and $R^3$ are each independently a straight- or branched-chain $C_1$-$C_{10}$ alkyl group; and X a straight-chain $C_1$-$C_{10}$ alkyl group, a hydroxy group or an —$OCOR^6$ group wherein $R^6$ is a hydrogen atom or a straight- or branched-chain $C_1$-$C_6$ alkyl group; and Z is —O— or —$NR^6$— wherein $R^6$ is a hydrogen atom or a straight- or branched-chain $C_1$-$C_6$ alkyl group.

5. A colorant comprising a heteropolycyclic compound according to claim 1.

6. A pigment or dye comprising a heteropolycyclic compound according to claim 1.

7. A colorant comprising a heteropolycyclic compound according to claim 2.

8. A colorant comprising a heteropolycyclic compound according to claim 3.

9. A colorant comprising a heteropolycyclic compound according to claim 4.

10. A pigment or dye comprising a heteropolycyclic compound according to claim 2.

11. A pigment or dye comprising a heteropolycyclic compound according to claim 3.

12. A pigment or dye comprising a heteropolycyclic compound according to claim 4.

* * * * *